United States Patent
Chung

(10) Patent No.: US 10,563,627 B2
(45) Date of Patent: Feb. 18, 2020

(54) AIR CLEANER UNIT AND ENGINE HAVING THE SAME

(71) Applicants: Hyundai Motor Company, Seoul (KR); Kia Motors Corporation, Seoul (KR)

(72) Inventor: Hanshin Chung, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 114 days.

(21) Appl. No.: 15/799,849

(22) Filed: Oct. 31, 2017

(65) Prior Publication Data

US 2018/0334999 A1  Nov. 22, 2018

(30) Foreign Application Priority Data

May 16, 2017 (KR) .................. 10-2017-0060521

(51) Int. Cl.
| | |
|---|---|
| *B01D 46/00* | (2006.01) |
| *B01D 46/10* | (2006.01) |
| *B01D 46/06* | (2006.01) |
| *B01D 46/42* | (2006.01) |
| *B01D 50/00* | (2006.01) |
| *B60K 13/02* | (2006.01) |
| *F02M 35/04* | (2006.01) |
| *F02M 35/14* | (2006.01) |
| *F02M 35/02* | (2006.01) |
| *F02M 35/024* | (2006.01) |

(52) U.S. Cl.
CPC ..... *F02M 35/0201* (2013.01); *B01D 46/0005* (2013.01); *B01D 46/10* (2013.01); *F02M 35/02416* (2013.01); *B01D 2279/60* (2013.01)

(58) Field of Classification Search
CPC .... B01D 46/00; B01D 46/0004; B01D 46/06; B01D 46/42; B01D 50/00; B01D 46/0005; B01D 46/10; B01D 2279/60; B60K 13/02; B60H 1/00378; F02M 35/04; F02M 35/14; F02M 35/0201; F02M 35/02416
USPC .............. 55/385.3, 418, DIG. 28; 123/198 E, 123/184.57, 198; 181/229; 180/68.1, 180/68.2, 68.3, 69.21; 60/297
See application file for complete search history.

(56) References Cited

U.S. PATENT DOCUMENTS

| | | | | |
|---|---|---|---|---|
| 4,932,490 | A * | 6/1990 | Dewey .................. | B60K 13/02 180/68.3 |
| 5,251,712 | A * | 10/1993 | Hayashi ................ | B60K 13/02 180/68.3 |
| 5,740,774 | A * | 4/1998 | Kennedy ................ | F02M 35/04 123/198 E |
| 6,068,675 | A * | 5/2000 | Tsuda .................... | B62D 25/10 123/198 E |
| 6,355,095 | B1 * | 3/2002 | Kuo-Long ............... | A61L 9/16 55/385.3 |

(Continued)

*Primary Examiner* — Minh Chau T Pham
(74) *Attorney, Agent, or Firm* — Morgan, Lewis & Bockius LLP

(57) ABSTRACT

An air cleaner device may include an air housing which has a hose outlet; an air duct which is protrudingly formed at one side of the air housing toward a front side of an engine compartment and introduces outside air; a filter casing which includes a filter seating portion which is formed in the air housing to face the air duct; and an air filter which is installed on the filter seating portion.

13 Claims, 5 Drawing Sheets

(56) References Cited

U.S. PATENT DOCUMENTS

| | | | | |
|---|---|---|---|---|
| 6,692,347 | B1* | 2/2004 | Schneider | B60H 3/0641 |
| | | | | 454/158 |
| 6,852,151 | B2* | 2/2005 | Bloomer | F02M 35/14 |
| | | | | 123/184.57 |
| 7,114,475 | B2* | 10/2006 | Vanderveen | F02M 35/024 |
| | | | | 123/90.38 |
| 7,833,300 | B2* | 11/2010 | Taniuchi | E02F 9/0866 |
| | | | | 123/198 E |
| 8,025,707 | B2* | 9/2011 | Furuya | B01D 46/06 |
| | | | | 123/198 E |
| 8,596,396 | B1* | 12/2013 | Ricketts | A01D 41/1252 |
| | | | | 123/41.11 |
| 8,728,192 | B2* | 5/2014 | Metzger | B01D 46/0004 |
| | | | | 55/385.1 |
| 2003/0131572 | A1* | 7/2003 | Roudet | B60H 1/00378 |
| | | | | 55/385.3 |
| 2012/0108156 | A1* | 5/2012 | Himanen | B60H 1/00378 |
| | | | | 454/140 |

* cited by examiner

AIR CLEANER UNIT AND ENGINE HAVING THE SAME

CROSS-REFERENCE TO RELATED APPLICATION

The present application claims priority to Korean Patent Application No. 10-2017-0060521 filed on May 16, 2017, the entire contents of which is incorporated herein for all purposes by this reference.

BACKGROUND OF THE INVENTION

Field of the Invention

The present invention relates to an air cleaner device and an engine having the same, and more particularly, to an air cleaner device which improves structural rigidity and may be provided for common use regardless of the type of engine, and an engine having the same.

Description of Related Art

In general, an air cleaner for a vehicle is configured to remove dust and foreign substances contained in outside air introduced into an engine.

The air cleaner has a filter or an element provided in a casing, such that outside air is filtered while passing through the filter or the element.

Here, the air cleaner is classified into a dry air cleaner and a wet air cleaner based on the type of the embedded element.

The dry air cleaner uses paper or a fiber material as the element, and the wet air cleaner uses oil as the element.

The dry air cleaner is used in most cases, but the wet air cleaner is used in a case in which it is difficult to change the element due to an installation location or a maintenance situation.

Therefore, the dry air cleaner is mostly used for an air cleaner for a vehicle of which the element is easily changed.

The air cleaner is associated with the engine and disposed in an engine compartment, and in some vehicles, a space is narrow due to arrangement design of the engine compartment or there may be no appropriate arrangement space unless the shape of the air cleaner is changed.

The air cleaner for a vehicle in the related art typically has a structure in which an upper casing is fixed to a lower casing by bolts and clamps. Thus, the upper casing needs to be completely separated from the lower casing to change a filter, and as a result, a space is further required to separate the upper casing.

Therefore, the air cleaner for a vehicle in the related art is configured as an obstruction that hinders free and effective arrangement design of the engine compartment, and the air cleaner for a vehicle in the related art also occupies a larger space.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air cleaner device for a vehicle, in which only a hose outlet of an air housing is changed and applied corresponding to the type of engine, such that production costs are reduced and efficient specification management is enabled.

Various aspects of the present invention are directed to providing an air cleaner device including: an air housing which has a hose outlet; an air duct which protrudes at one side of the air housing toward a front side of an engine compartment and introduces outside air; a filter casing which includes a filter seating portion formed which is formed in the air housing to face the air duct; and an air filter which is disposed on the filter seating portion.

An installation port for mounting the air filter may be formed at one side of the air housing to face the filter casing, and the air housing may include a cover mounted on the installation port.

The cover may include a horizontal surface, and a vertical surface bent in a longitudinal direction thereof, and the cover may cover the installation port.

A plurality of support protrusions may protrude on the cover to press-fit the air filter.

The air housing may be disposed along an edge portion of the engine compartment.

The filter casing may have both sides which are directed toward an internal passageway of the air housing and have triangular cross sections to prevent outside air from being directly introduced into the air housing.

The filter seating portion may be formed to be inclined downward from a front side to a rear side of the air housing so that the air filter is mounted in an inclined state.

Various aspects of the present invention are directed to providing an engine having an air cleaner device including: an engine encapsulation which is provided in an engine compartment and includes a lateral shield plate and an upper shield plate; an air housing which is formed in a pipe shape, has a hose outlet, and supports the upper shield plate; an air duct which protrudes at one side of the air housing toward a front side of the engine compartment and introduces outside air; a filter casing which includes a filter seating portion which is formed in the air housing to face the air duct; and an air filter which is disposed on the filter seating portion.

The air cleaner device may be connected to the lateral shield plate.

An installation port for mounting the air filter may be formed at one side of the air housing to face the filter casing, and the air housing may include a cover mounted on the installation port.

The cover may include a horizontal surface, and a vertical surface bent in a longitudinal direction thereof, and the cover may cover the installation port.

A plurality of support protrusions may protrude on the cover to press-fit the air filter.

The air housing may be disposed along an edge portion of the engine compartment.

The filter casing may have both sides which are directed toward an internal passageway of the air housing and have triangular cross sections to prevent outside air from being directly introduced into the air housing.

The filter seating portion may be formed to be inclined downward from a front side to a rear side of the air housing so that the air filter is mounted in an inclined state.

In addition, other effects obtained or expected by the exemplary embodiments of the present invention will be directly or implicitly included in the detailed description of the exemplary embodiments of the present invention. That is, various effects expected according to the exemplary embodiments of the present invention will be included in the detailed description to be described below.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
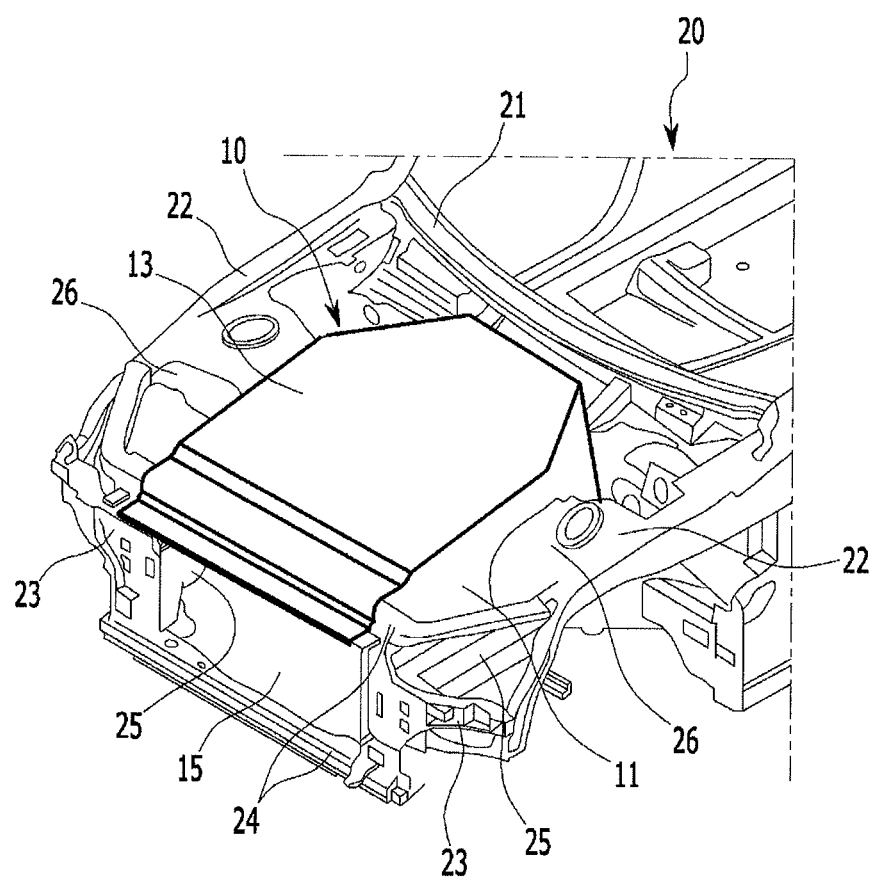
FIG. 1 is a configuration view of an engine encapsulation of an engine compartment to which an air cleaner device for a vehicle according to an exemplary embodiment of the present invention is applied.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
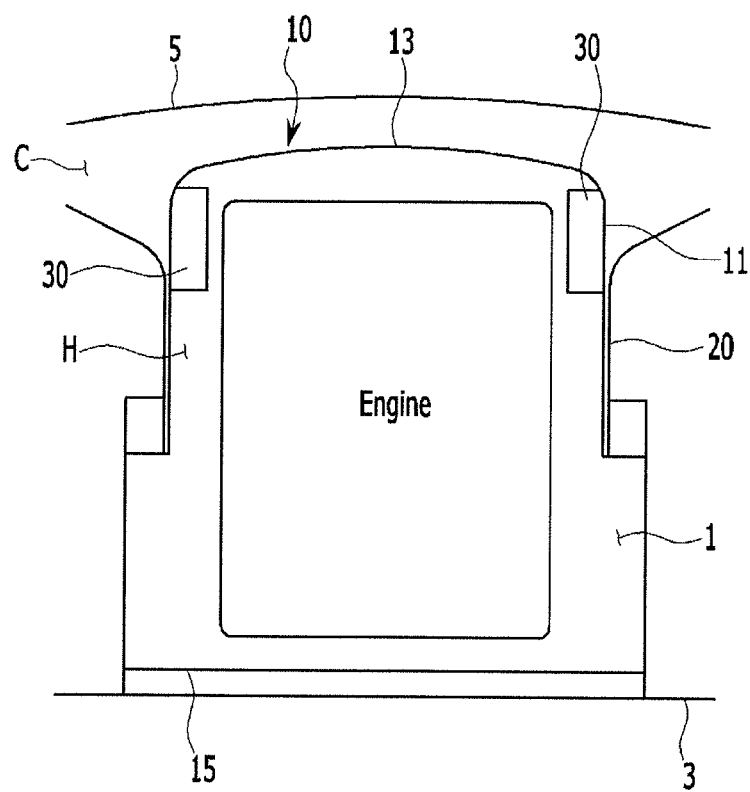
FIG. 2 is a schematic view of the engine compartment provided with the air cleaner device for a vehicle according to the exemplary embodiment of the present invention.

FIG. 1 is a configuration view of an engine encapsulation of an engine compartment to which an air cleaner device for a vehicle according to an exemplary embodiment of the present invention is applied, and FIG. 2 is a schematic view of the engine compartment provided with the air cleaner device for a vehicle according to the exemplary embodiment of the present invention.

Referring to FIG. 1 and FIG. 2, an engine encapsulation 10 is provided in an engine compartment 1 of a vehicle to which an air cleaner device for a vehicle according to an exemplary embodiment of the present invention is applied.

The engine encapsulation 10 of the engine compartment 1 is mounted on a vehicle body 20 to surround an engine ENG.

Here, the engine encapsulation 10 of the engine compartment 1 is a shield apparatus for the engine ENG and inhibits heat generated in the engine ENG from radiating to the outside, such that a temperature of the engine ENG is maintained and fuel consumption is minimized when the engine ENG is initially started.

First, the vehicle body 20 includes a cowl 21, fender apron upper members 22, fender apron reinforcing members 23, front end portion modules 24, front side members 25, and shock absorber housings 26.

The cowl 21 is a panel connected at a front side of a front glass of the vehicle.

In addition, the cowl 21 may extend from a dash board or may be mounted on the dash board.

The fender apron upper member 22 is an upper member of a fender apron.

That is, the fender apron upper member 22 is provided at an upper side of the fender apron which is disposed inside a fender, which is a mudguard, and the fender apron is configured as a partition between a wheel and the engine compartment 1.

The fender apron reinforcing member 23 connects the fender apron to other members of the vehicle body 20 to reinforce rigidity of the fender apron.

The fender apron reinforcing member 23 connects the fender apron upper member 21 to the front end portion module 24.

Furthermore, the front side member 25 is provided below a front floor or and the dash board in a longitudinal direction, which is a longitudinal direction of the vehicle body, and the front side member 25 is a beam that defines a framework of a front body.

The shock absorber housing 26 is a portion in which a shock absorber is mounted, and the shock absorber housing 26 is disposed between the fender apron upper member 22 and the front side member 25.

The front end portion module 24 is a member made by integrating several components at a front side of the vehicle body 20 into a single module.

That is, the front end portion module 24 is disposed at a foremost side of the front body.

Because the members of the vehicle body 20, which form the front body, are obvious to those skilled in the art, a further detailed description thereof will be omitted.

Meanwhile, the engine encapsulation 10 includes a lateral shield plate 11, an upper shield plate 13, and a lower shield plate 15.

The lateral shield plate 11 shields a lateral side and a rear side of the engine compartment 1, and the lateral shield plate 11 is connected to the vehicle body 20.

In the present description, the upward, downward, forward, and rearward directions are based on the upward, downward, forward, and rearward directions of the vehicle.

The upper shield plate 13 is disposed to cover the lateral shield plate 11.

That is, the upper shield plate 13 shields an upper side of the engine compartment 1.

In addition, one end portion of the upper shield plate 13 is mounted on the front end portion module 24, and one end portion of the lateral shield plate 11 is mounted on the front side member 25.

Furthermore, the lower shield plate 15 is provided to shield a lower side of the engine compartment 1.

In addition, the lower shield plate 15 is mounted on an under guard 3.

In addition, the lower shield plate 15 may be formed to have a surface disposed on the same plane as the under guard 3.

Here, the under guard 3 is a panel for protecting driving devices disposed at lower and bottom sides of the engine ENG.

One front end portion of the under guard 3 is connected to the front end portion module 24 and extending rearward while passing over front wheels of the vehicle.

Furthermore, the lower shield plate 15 may extend in a longitudinal direction of the under guard 3.

Therefore, the lower shield plate 15 may cover not only the lower side of the engine ENG, but also various devices disposed at the lower side of the vehicle.

The lateral shield plate 11, the upper shield plate 13, and the lower shield plate 15 may be integrally formed or may be independently formed and then assembled.

Meanwhile, an air cleaner device 30 for a vehicle according to the exemplary embodiment of the present invention is connected to the engine encapsulation 10.

That is, the air cleaner device 30 may be mounted to support the upper shield plate 13 of the engine encapsulation 10.

The air cleaner device 30 is provided to receive air from the outside of the engine encapsulation 10.

Meanwhile, the engine compartment 1 is a space in which the engine ENG is disposed.

In addition, an upper side of the engine compartment 1 is closed by a hood 5 which is called a bonnet, a lateral side of the engine compartment 1 is closed by the vehicle body 20, and a lower side of the engine compartment 1 is closed by the under guard 3.

Because the engine compartment 1, which is formed to be surrounded by the under guard 3, the hood 5, and the vehicle body 20, is obvious to those skilled in the art, a further detailed description thereof will be omitted.

Meanwhile, the engine compartment 1 is divided by the engine encapsulation 10.

That is, since the engine encapsulation 10 is disposed to surround the engine ENG in the engine compartment 1, the engine compartment 1 is divided into an internal side and an external side of the engine encapsulation 10.

In addition, since the engine encapsulation 10 inhibits heat generated in the engine ENG from radiating to the outside, the internal side of the engine encapsulation 10 is a high-temperature region (hot area) H in which an air temperature is relatively high, and the external side of the engine encapsulation 10 is a low-temperature region (cold area) C in which an air temperature is relatively low.

Figure 3:
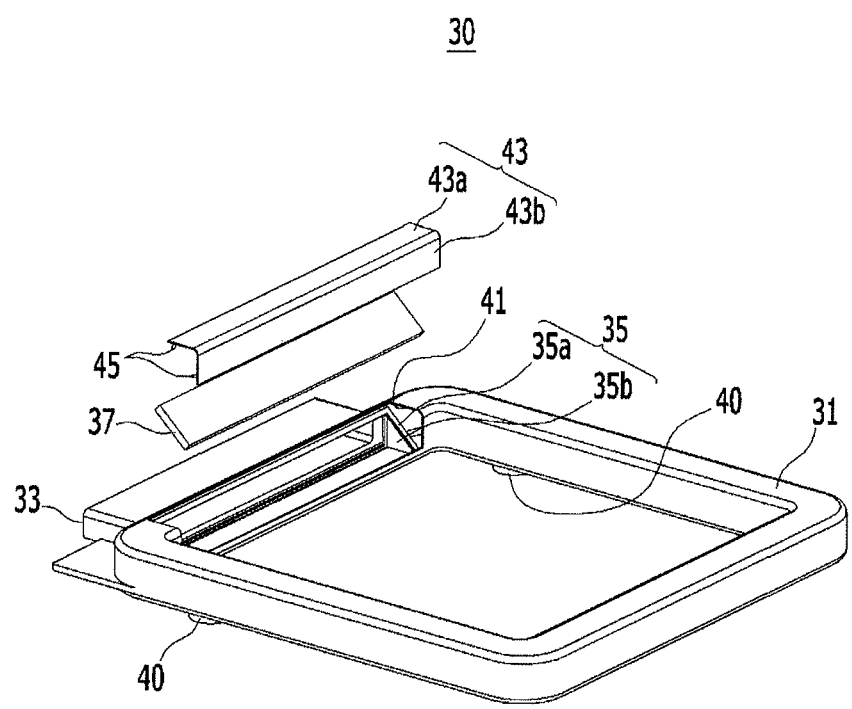
FIG. 3 is an exploded perspective view of the air cleaner device for a vehicle according to the exemplary embodiment of the present invention.
Figure 4:
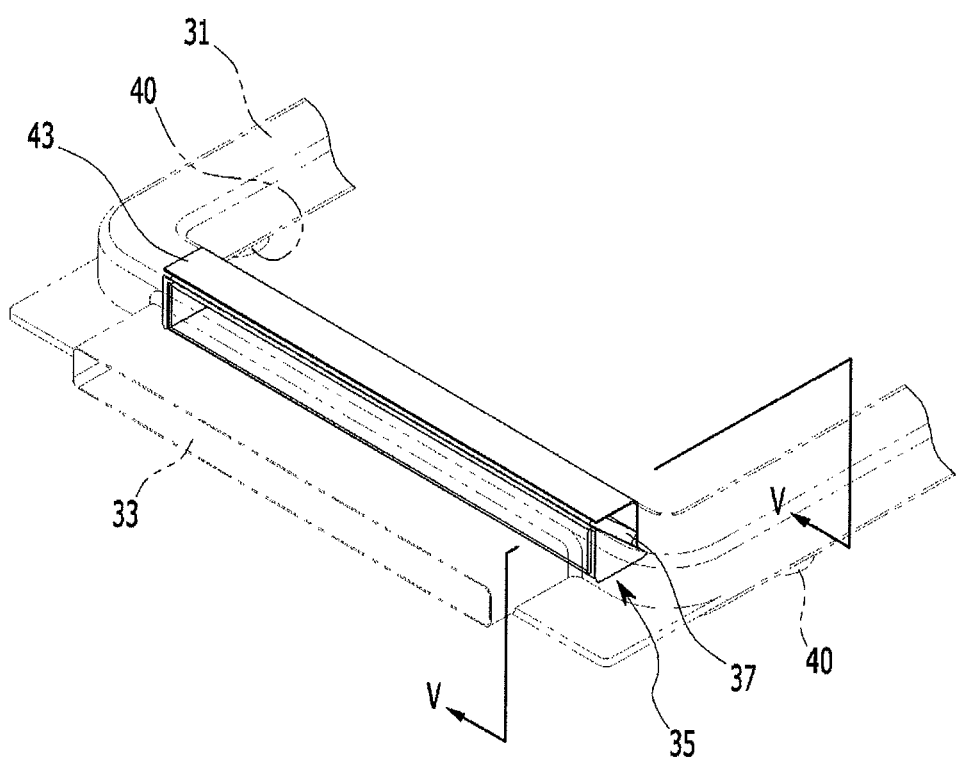
FIG. 4 is a partially enlarged perspective projection view of the air cleaner device for a vehicle according to the exemplary embodiment of the present invention.
Figure 5:
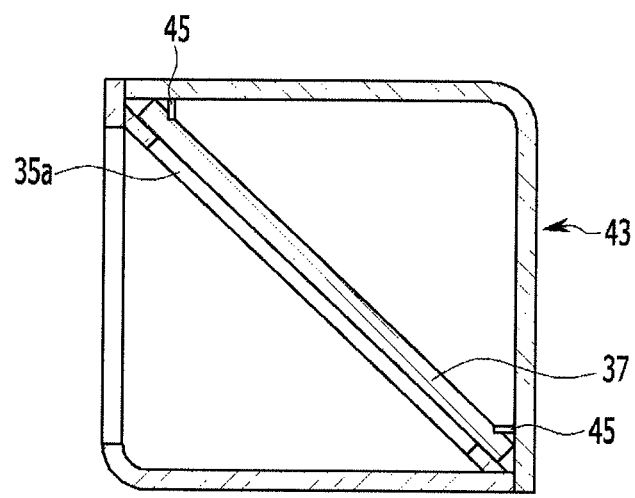
FIG. 5 is a cross-sectional view taken along line V-V in FIG. 4.

FIG. 3 is an exploded perspective view of the air cleaner device for a vehicle according to the exemplary embodiment of the present invention, FIG. 4 is a partially enlarged perspective projection view of the air cleaner device for a vehicle according to the exemplary embodiment of the present invention, and FIG. 5 is a cross-sectional view taken along line V-V in FIG. 4.

Referring to FIG. 3, FIG. 4, and FIG. 5, the air cleaner device 30 for a vehicle according to the exemplary embodiment of the present invention includes an air housing 31, an air duct 33, a filter casing 35, and an air filter 37.

The air housing 31 may be formed in, but not limited to, a pipe shape, and air housings having various shapes may be applied in accordance with a shape of the engine compartment.

In addition, hose outlets 40 are formed in the air housing 31.

In the instant case, the hose outlet 40 may be connected to an air intake hose.

The air intake hose is formed to extend to an intake passageway of the engine ENG so that outside air introduced into an internal space of the air housing 31 is supplied to the engine ENG.

That is, the air intake hose is configured as a passageway through which air filtered by the air filter 37 is sent to a throttle body of the engine ENG, and the air intake hose also is configured to absorb vibration generated by the engine ENG.

The number of hose outlets 40 connected to the air intake hose and the position of the hose outlets 40 may be changed in accordance with the type of engine ENG.

That is, the hose outlet 40 may be changed in number and position in accordance with the number of intake passageways formed in the engine ENG and the installation position of the intake passageways, and as a result, the air cleaner device may be applied to various types of vehicles.

In addition, as shown in FIG. 3, the air housing 31 may include four rounded edge portions, but it is not limited thereto.

The air housing 31 is disposed along an edge portion of the engine compartment 1 and may support the upper shield plate 13.

That is, the air housing 31 is disposed at the lower side of the upper shield plate 13 and supports the upper shield plate 13.

In addition, the air cleaner device 30 for a vehicle according to the exemplary embodiment of the present invention is connected to the lateral shield plate 11, improving structural rigidity of the lateral side of the engine compartment.

In addition, an installation port 41 for mounting the air filter 37 is formed at one side of the air housing 31 to face the filter casing 35.

The air housing 31 includes a cover 43 mounted on the installation port 41.

In the instant case, the cover 43 may include a horizontal surface 43a, and a vertical surface 43b bent in the longitudinal direction thereof, and the cover 43 is mounted on the installation port 41.

For example, the cover 43 may be mounted on the installation port 41 in an interference fit manner or by fastening bolts.

A plurality of support protrusions 45 protrudes on the cover 43 at both sides of an internal surface of the cover 43 which faces the air filter 37 so that the air filter 37 is press-fitted into the filter casing 35.

Furthermore, the air duct 33 protrudes from the air housing 31 and introduces outside air.

The air duct 33 is formed integrally with the air housing 31 in a state in which the air duct 33 is opened toward the front side of the engine compartment 1.

The air duct 33 may be elongated in a vehicle's width direction to increase an introduction area through which outside air is introduced.

Furthermore, the filter casing 35 is formed in the air housing 31 to mount the air duct 33.

The filter casing 35 includes a filter seating portion 35a that supports the air filter 37.

In the instant case, the filter seating portion 35a is formed to be inclined downward from the front side to the rear side of the air housing 31 so that the air filter 37 is mounted in an inclined state.

Since the air filter 37 is mounted in an inclined state, a contact area between the air filter 37 and the introduced air is relatively increased, such that filter efficiency may be improved and a local increase in air pressure may be prevented.

In addition, the filter casing 35 includes support surfaces 35b of which both sides directed toward the internal passageway of the air housing 31 have triangular cross sections, and the support surfaces 35b serve as partition walls with respect to a portion of the internal passageway.

In other words, the filter casing 35 includes the support surfaces 35b formed at both sides of the filter seating portion 35a, and prevents the outside air introduced from the air duct 33 from being introduced into the internal passageway of the air housing 31 without passing through the air filter 37.

In addition, the air filter 37 is press-fitted into the filter seating portion 35a by the support protrusions 45 of the cover 43, and as a result, the air filter 37 is prevented from being separated.

The air cleaner device 30 for a vehicle according to the exemplary embodiment of the present invention may be applied to the engine compartment 1 provided with the engine encapsulation 10 including the lateral shield plate 11, the upper shield plate 13, and the lower shield plate 15, and the air cleaner device 30 is disposed at the lower side of the upper shield plate 13 to support the upper shield plate 13, improving structural rigidity.

In addition, the air cleaner device 30 for a vehicle according to the exemplary embodiment of the present invention is connected to the lateral shield plate 11, improving structural rigidity of the lateral side of the engine compartment.

In addition, the air cleaner device 30 for a vehicle according to the exemplary embodiment of the present invention may be applied by changing only the hose outlet 40 of the air housing 31 in accordance with the type of engine ENG, and as a result, production costs may be reduced and efficient specification management is enabled.

The air cleaner device 30 for a vehicle according to the exemplary embodiment of the present invention may be provided even in a vehicle to which no engine encapsulation 10 is applied, and the air cleaner device 30 may be applied to various engines or various engine compartment shapes, and as a result, the components may be used in common.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air cleaner device comprising:
an air housing which has a hose outlet;
an air duct which is protrudingly formed at a side of the air housing toward a front side of an engine compartment out of the air housing and introduces outside air;
a filter casing which includes a filter seating portion which is formed in the air housing to face the air duct; and
an air filter which is disposed on the filter seating portion,
wherein an installation port for mounting the air filter is formed at a side of the air housing to face the filter casing,
wherein the air housing includes a cover mounted on the installation port,
wherein the cover includes a horizontal surface, and a vertical surface bent in a longitudinal direction thereof and perpendicular to the horizontal surface, and the cover covers the installation port, and
wherein the air duct protruding out of the air housing is formed to be aligned perpendicular to a longitudinal direction of the air filter.

2. The air cleaner device of claim 1, wherein
a plurality of support protrusions is protrudingly formed on the cover to press-fit the air filter.

3. The air cleaner device of claim 1, wherein
the air housing is disposed along an edge portion of the engine compartment.

4. The air cleaner device of claim 1, wherein
the filter casing has a first side and a second side which are directed toward an internal passageway of the air housing and have triangular cross sections to prevent outside air from being directly introduced into the air housing.

5. The air cleaner device of claim 1, wherein
the filter seating portion is formed to be inclined downward from a front side to a rear side of the air housing wherein the air filter is mounted in an inclined state.

6. An engine having an air cleaner device, the engine comprising:
an engine encapsulation which is provided inside an engine compartment and includes a lateral shield plate and an upper shield plate;
an air housing which is formed in a pipe shape, has a hose outlet, and supports the upper shield plate;
an air duct which is protrudingly formed at a side of the air housing toward a front side of the engine compartment out of the air housing and introduces outside air;
a filter casing which includes a filter seating portion which is formed in the air housing to face the air duct; and
an air filter which is disposed on the filter seating portion,
wherein the air duct protruding out of the air housing is formed to be aligned perpendicular to a longitudinal direction of the air filter.

7. The engine of claim 6, wherein
the air cleaner device is connected to the lateral shield plate.

8. The engine of claim 6, wherein
an installation port for mounting the air filter is formed at a side of the air housing to face the filter casing, and
the air housing includes a cover mounted on the installation port.

9. The engine of claim 1, wherein
the cover includes a horizontal surface, and a vertical surface bent in a longitudinal direction thereof, and the cover covers the installation port.

10. The engine of claim 8, wherein
a plurality of support protrusions is protruding formed on the cover to press-fit the air filter.

11. The engine of claim 6, wherein
the air housing is disposed along an edge portion of the engine compartment.

12. The engine of claim 6, wherein
the filter casing has a first side and a second side which are directed toward an internal passageway of the air housing and have triangular cross sections to prevent outside air from being directly introduced into the air housing.

13. The engine of claim 6, wherein
the filter seating portion is formed to be inclined downward from a front side to a rear side of the air housing wherein the air filter is mounted in an inclined state.

* * * * *